US010088170B2

(12) United States Patent
Iurk et al.

(10) Patent No.: US 10,088,170 B2
(45) Date of Patent: Oct. 2, 2018

(54) INTERIOR MOUNTED COOKTOP BRACKET FOR CONCEALED AND SURFACE MOUNTED INSTALLATION

(71) Applicant: Whirlpool Corporation, Benton Harbor, MI (US)

(72) Inventors: Carlos Eduardo Iurk, Joinville (BR); Guilherme Moreira De Alcantara Filho, Joinville (BR); Ledimara Mascarello, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 835 days.

(21) Appl. No.: 14/565,771

(22) Filed: Dec. 10, 2014

(65) Prior Publication Data

US 2016/0169532 A1 Jun. 16, 2016

(51) Int. Cl.

| | |
|---|---|
| ***F24C 15/10*** | (2006.01) |
| ***H05B 3/74*** | (2006.01) |
| ***B23P 19/04*** | (2006.01) |
| ***H05B 6/12*** | (2006.01) |

(52) U.S. Cl.
CPC ............. *F24C 15/108* (2013.01); *H05B 3/74* (2013.01); *H05B 6/1209* (2013.01)

(58) Field of Classification Search
CPC ........ H05B 6/1209; H05B 3/74; F24C 15/108
USPC ............... 219/452.12; 29/525.02; 248/224.7, 248/227.2, 241, 257; 4/632, 633
See application file for complete search history.

(56) References Cited

U.S. PATENT DOCUMENTS

| | | | | |
|---|---|---|---|---|
| 3,561,020 A * | 2/1971 | Fritzsche | F24C 15/108 126/211 |
| 3,924,602 A | 12/1975 | Irwin | |
| 4,363,956 A | 12/1982 | Scheidler et al. | |
| 5,183,996 A * | 2/1993 | Hazan | F24C 15/105 219/445.1 |
| 5,185,047 A | 2/1993 | Ray | |
| 5,791,336 A | 8/1998 | Helm | |
| 6,234,024 B1 | 5/2001 | Gotz et al. | |
| 8,262,331 B2 * | 9/2012 | Toosky | F16B 33/004 411/361 |

* cited by examiner

*Primary Examiner* — Dana Ross
*Assistant Examiner* — James Sims, III
(74) *Attorney, Agent, or Firm* — Price Heneveld LLP

(57) ABSTRACT

An inside-mount countertop-range support for a flush-mount countertop range includes a counter bracket configured to be engaged to an inner edge of an opening defined within a countertop with a top surface. A base flange extends from the counter bracket and into the opening. The inside-mount countertop-range support includes a range having a housing and top member above the housing that extends over the opening and includes a bottom surface, wherein the housing is configured to be disposed within the opening. A range bracket is configured to be coupled to the housing and includes a top flange that is configured to be supported by the base flange, wherein when the top flange rests upon the base flange, the bottom surface of the top member engages and is flush with the top surface of the countertop.

13 Claims, 6 Drawing Sheets

INTERIOR MOUNTED COOKTOP BRACKET FOR CONCEALED AND SURFACE MOUNTED INSTALLATION

FIELD OF THE INVENTION

The present invention generally relates to surface-mounted kitchen cooktops, and more specifically, a concealed bracket for mounting and supporting a surface-mounted kitchen cooktop.

BACKGROUND OF THE INVENTION

Certain kitchen cooktops for residential and commercial applications are mounted within a surface of the countertop. Such ranges are not attached to a stand-alone appliance but are typically inserted within an opening defined within a countertop surface. In order to support such ranges, various mounting applications are disposed proximate the opening within the countertop in order to support the cooking appliance.

SUMMARY OF THE INVENTION

In at least one aspect, an inside-mount countertop-range support for a flush-mount countertop range includes a counter bracket configured to be engaged to an inner edge of an opening defined within a countertop with a top surface. A base flange extends from the counter bracket and into the opening. The inside-mount countertop-range support includes a range having a housing and top member above the housing that extends over the opening and includes a bottom surface, wherein the housing is disposed within the opening. A range bracket is coupled to the housing and includes a top flange that is received by and supported by the base flange. When the top flange rests upon the base flange, the bottom surface of the top member engages and is flush with the top surface of the countertop.

In at least another aspect, an opening-mounted range support for a flush-mount countertop range includes a range having a range housing and a cooktop member. The cooktop member has a bottom face that extends beyond an outer perimeter of the range housing. The opening-mounted range support also includes a base flange extending from an inner edge of an opening defined within a countertop. The bottom face of the cooktop member extends beyond the inner edge of the opening. The countertop includes an upper face. A top flange extends outward from the perimeter of the range housing, wherein the top flange is supported by the base flange such that the bottom face of the cooktop member is flush with the upper face of the countertop and the cooktop member is minimally supported by the upper face of the countertop.

In at least another aspect, a method for installing a flush-mount countertop range into a countertop using an inside-mount countertop-range support includes the steps of disposing a plurality of counter brackets onto an inner edge of an opening defined within the countertop, wherein the countertop includes a top surface, and wherein each of the plurality of counter brackets is installed such that a corresponding base flange extends from the counter bracket and into the opening. An adjustment member is provided within each base flange of the plurality of countertop brackets. Each adjustment member includes a threaded pin that rotates within the base flange and vertically operates the threaded pin relative to the base flange as the threaded pin is rotated within the base flange. A range is provided having a housing and top member above the housing. The top member is sized to extend over the entire opening defined within the countertop. The top member also includes a bottom surface. At least one range bracket is attached to the housing. The at least one range bracket includes a top flange that extends outward from the housing toward an edge of the top member. The range and the at least one range bracket are disposed into the opening defined within the countertop such that the top flange of the at least one range bracket rests upon a top portion of each threaded pin of the plurality of counter brackets. The rotation of each threaded pin vertically operates the top flange and the range relative to the base flange and the countertop. Each threaded pin is adjusted to vertically operate the range such that the bottom surface of the top member of the range engages and is flush with the top surface of the countertop, and wherein the top member is minimally supported by the top surface of the countertop.

These and other features, advantages, and objects of the present device will be further understood and appreciated by those skilled in the art upon studying the following specification, claims, and appended drawings.

DETAILED DESCRIPTION OF EMBODIMENTS

Figure 1:
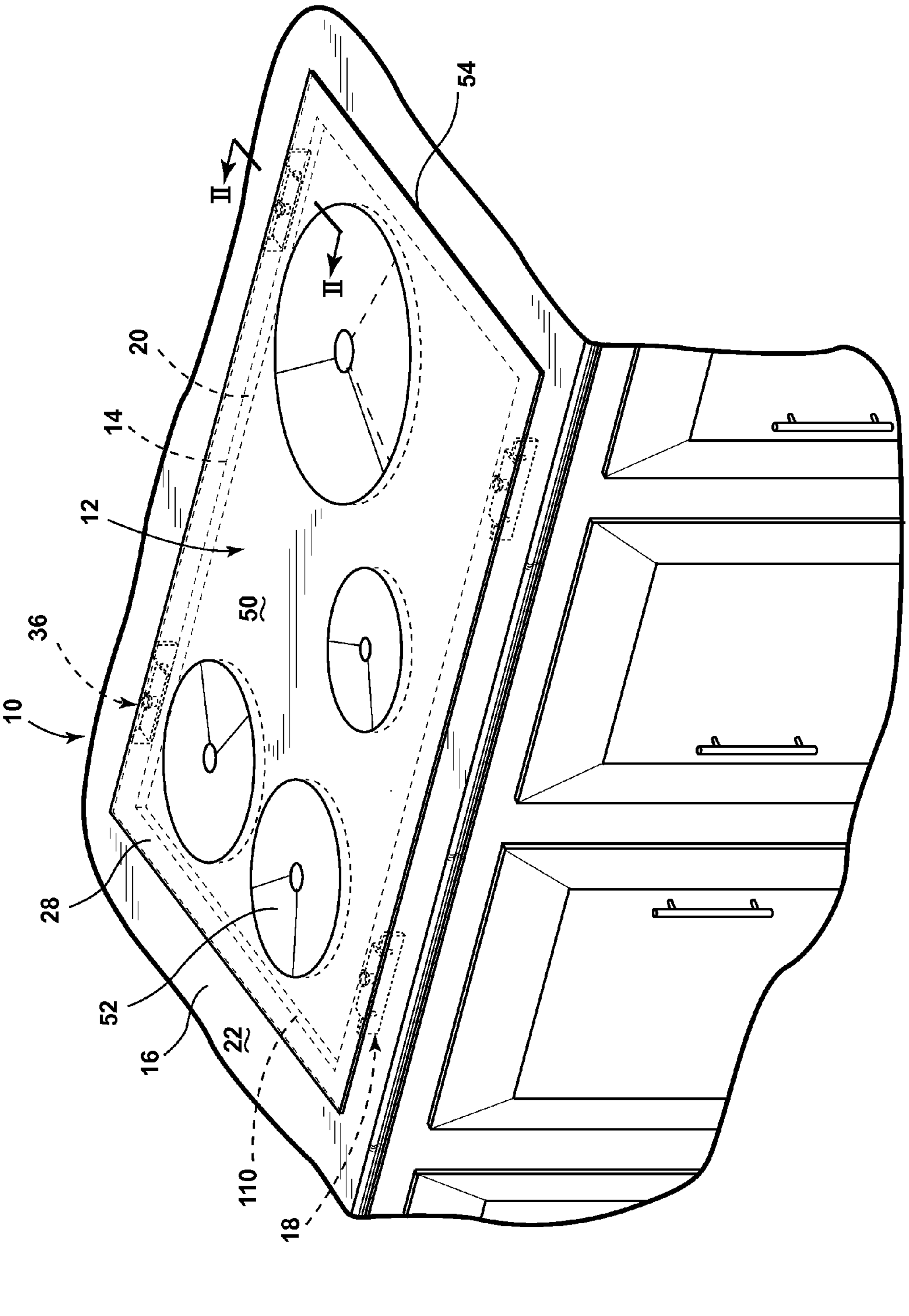
FIG. 1 is a top perspective view of a countertop incorporating a cooktop range using one embodiment of the inside-mount countertop-range support.

For purposes of description herein the terms “upper,” “lower,” “right,” “left,” “rear,” “front,” “vertical,” “horizontal,” and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally refers to an inside-mount countertop-range support for installing a flush-mount countertop range 12 within an opening 14 defined within a countertop 16 for a residential or commercial kitchen setting, according to one embodiment. The inside-mount countertop-range support 10 includes a counter bracket 18 configured to be engaged to an inner edge 20 of an opening 14 defined within a countertop 16. The countertop 16 includes a top surface 22, wherein a base flange 24 extends from the counter bracket 18 and into the opening 14 defined within the countertop 16. The range 12 includes a housing 26 and a top member 28 that is disposed above the housing 26, wherein the top member 28 extends over and beyond the inner edge 20 of the opening 14, and wherein the top member 28 includes a bottom surface 30. The housing 26 is disposed within the opening 14. A range bracket 32 is configured to be coupled to the housing 26 and includes a top flange 34 that is received by and supported by the base flange 24. The top flange 34 rests upon the base flange 24 such that the bottom surface 30 of the top member 28 engages with and is flush with the top surface 22 of the countertop 16. According to various embodiments, an adjustment member 36 is disposed within the base flange 24, wherein the adjustment member 36 adjusts the height of the top flange 34 relative to the base flange 24 such that a top member 28 is flush with the countertop 16. Additionally, the adjustment member 36 vertically operates the height of the top flange 34 relative to the base flange 24 such that the top member 28 is minimally supported, if at all, by the top surface 22 of the countertop 16.

Referring again to the embodiment of FIGS. 1-4, the range 12 is configured to have a housing 26 that is set within the opening 14 defined within the countertop 16. In this manner, the top member 28 which defines the cooking surface 50 for the range 12 conceals the presence of the housing 26 below the top member 28. Various cooking elements 52, including, but not limited to, induction, radiant heat, or other cooking elements, are disposed within the housing 26 to radiate heat through the top member 28 to define certain cooking stations within the top member 28 of the range 12. The top member 28 can include a beveled outer edge 54 that can include an angled surface or a curved surface that extends downward toward the top surface 22 of the countertop 16. In this manner, the outer edge 54 of the top member 28 defines a minimal transition between the top member 28 and the top surface 22 of the countertop 16.

According to the various embodiments, the top member 28 can be made of various materials that can include, but are not limited to, metal, glass, ceramic, combinations thereof, or other similar heat transferring material that can allow heat to be transferred from the elements disposed within the housing 26 through the top member 28 such that the cooking stations within the top member 28 can be properly defined.

Figure 2:
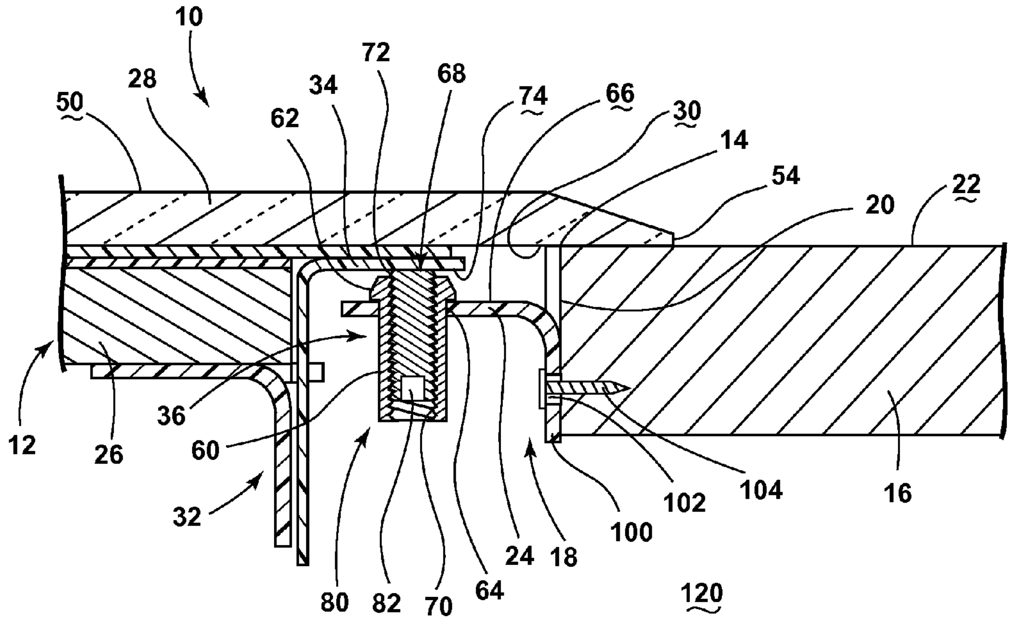
FIG. 2 is a cross-sectional view of the inside-mount countertop-range support of FIG. 1, taken along line II-II with the top member of the range installed flush with the top surface of the countertop.
Figure 3:
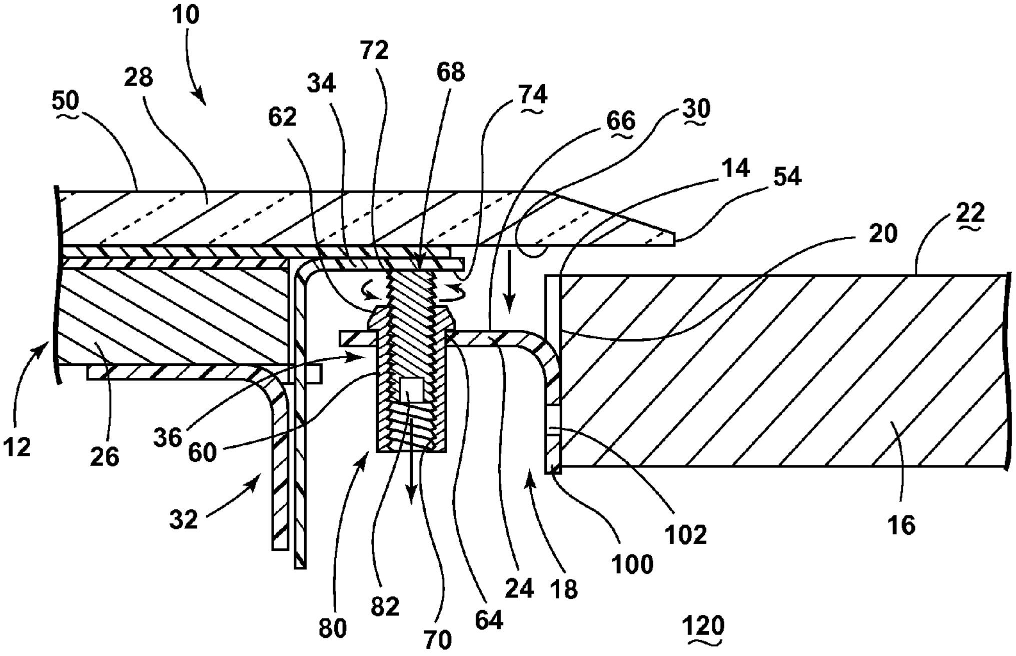
FIG. 3 is the cross-sectional view of the inside-mount countertop-range support as shown in FIG. 2, with the top member of the range installed above the top surface of the countertop before the threaded pin has been adjusted.
Figure 4:
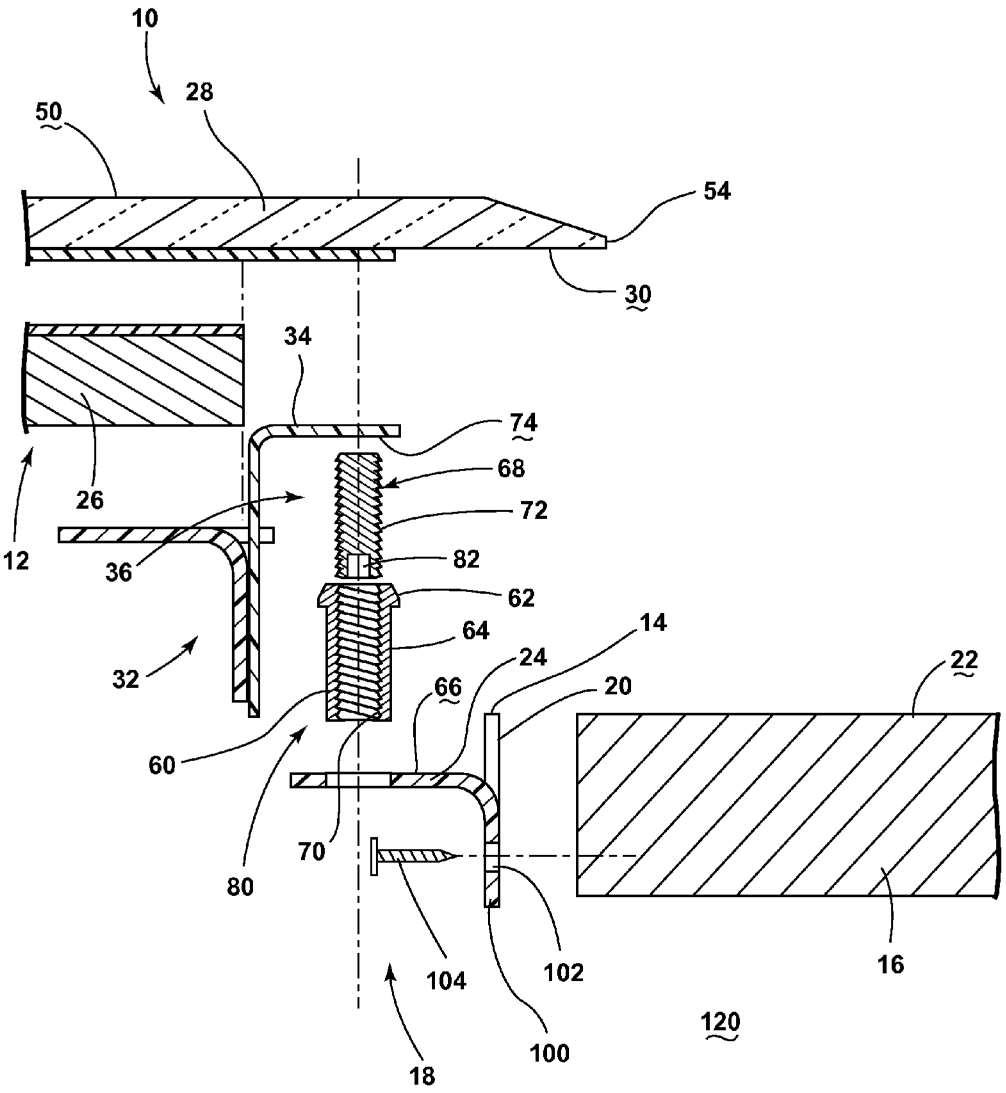
FIG. 4 is the cross-sectional view of the inside-mount countertop-range support of FIG. 2 exploded.

As illustrated in the embodiment of FIGS. 2-4, it is contemplated that the adjustment member 36 disposed within the base flange 24 can include an adjusting sleeve 60 having a perimetrical flange 62. It is contemplated that the adjusting sleeve 60 extends through a support opening 64 defined within the base flange 24, such that the perimetrical flange 62 rests upon an upper surface 66 of the base flange 24 and is supported by the area around the support opening 64. It is also contemplated that the adjustment member 36 can include a threaded pin 68 that cooperates with a threaded interior 70 of the adjusting sleeve 60. In such an embodiment, the threaded pin 68 is adapted to rotate within the threaded interior 70 of the adjusting sleeve 60 to vertically operate the threaded pin 68 relative to the adjusting sleeve 60 and the base flange 24. As the threaded pin 68 is rotated within the threaded interior 70 of the adjusting sleeve 60, a top portion 72 of the threaded pin 68 engages an underside 74 of the top flange 34, such that the top portion 72 of the threaded pin 68 can engage and vertically operate the top flange 34 between a plurality of vertical positions. Such operability of the threaded pin 68 can be used to account for imperfections and uneven surfaces in the base flange 24, the top flange 34, the top member 28, the countertop 16 or other component of the system.

According to various embodiments, the top portion 72 of the threaded pin 68 can include an engagement plate that provides a surface upon which the top flange 34 can rest. Additionally, such an engagement plate can be connected to the top portion 72 of the threaded pin 68 via a substantially spherical bearing member such that the engagement plate can operate between a plurality of angular positions. In turn, regardless of the particular application, the engagement plate will engage the top flange 34 in a substantially flush manner to maximize the supporting area defined between the top flange 34 and the threaded pin 68. Accordingly, the substantially spherical bearing of the engagement plate allows the engagement plate to wobble or tilt in a variety of directions, such that any variation in the top flange 34 that may make the underside 74 of the top flange 34 define a non-perpendicular angle in relation to the threaded pin 68 can be accounted for through the wobble or angular variation of the engagement plate of the threaded pin 68.

According to various alternate embodiments, the top portion 72 of the threaded pin 68 can include a substantially arcuate top surface 22 that can provide for a plurality of support points upon which the top flange 34 can rest and also account for any angular variation in relation to the top plate and the threaded pin 68. It is also contemplated that other supporting mechanisms can define the connection between the top flange 34 and the upper portion of the threaded pin 68, such that the upper portion of the threaded pin 68 can properly support the top flange 34 regardless of the angular orientation between the top flange 34 and the threaded pin 68, including any variations or discrepancies defined between the various components of the counter bracket 18 and the range bracket 32.

In operation, and as illustrated in the embodiment of FIG. 1, a plurality of counter brackets 18 can be installed upon the outer edge 54 of the opening 14 defined from the countertop 16. A typical arrangement may include four counter brackets 18, although additional counter brackets 18 can be installed upon the inner edge 20 of the opening 14 to define additional supporting points. It is also contemplated that fewer numbers of counter brackets 18 can be installed upon the inner edge 20 of the opening 14 defined within the countertop 16, depending upon the size of the range 12, the design of the counter brackets 18, the design of the range brackets 32, and the overall design of the particular kitchen application.

According to the example illustrated in FIGS. 1-4, four counter brackets 18 are disposed upon the inner edge 20 of the opening 14 defined within the countertop 16. In such an embodiment, the range 12 can include a matching number of range brackets 32 where each range bracket 32 includes a top flange 34 that is configured to cooperatively engage a matching counter bracket 18 such that each top flange 34 of each range bracket 32 engages a base flange 24 of each counter bracket 18. When the range 12 is installed within the opening 14 defined within the countertop 16 (as shown in FIG. 3), top portions 72 of each of the threaded pins 68 extending through the base flanges 24 of the various counter brackets 18 is configured to receive a corresponding top flange 34 of the matching range brackets 32. A bottom portion of each of the threaded pins 68 includes a tooling portion 80 that is configured to be rotated from below in order to vertically operate the threaded pin 68 within the threaded interior 70 of the adjusting sleeve 60. The tooling portion 80 can include a recess 82 for receiving various tools for rotating the threaded pin 68, where the recess 82 can be configured to receive a flat head screwdriver, Phillips screwdriver, Allen wrench, socket wrench, or other rotational-type tool for rotating the threaded pin 68 and vertically operating the threaded pin 68 within the threaded interior 70 of the adjusting sleeve 60. The tooling portion 80 can also include an adjustment slot defined within the bottom portion of the threaded pin 68. It is also contemplated that the tooling portion 80 can include an enlarged portion that can be grasped by hand and rotated by hand without the use of tools in order to vertically operate the threaded pin 68. In each of these configurations, the tooling portion 80, whether an adjustment slot that can receive a rotational type tool, an enlarged grasping apparatus or the tooling portion 80 is accessible from below proximate the adjusting sleeve 60 to rotate the threaded pin 68 within the threaded interior 70 of the adjusting sleeve 60 to vertically operate the threaded pin 68 relative to the base flange 24. In embodiments where the tooling portion 80 of the threaded pin 68 includes a recess 82 or adjustment slot for receiving a rotational-type tool such as a screwdriver or Allen wrench, the bottom portion of the threaded pin 68 can be disposed within the threaded interior 70 of the adjusting sleeve 60, such that a tool can be inserted through at least a portion of the threaded interior 70 of the adjusting sleeve 60 in order to rotationally operate the threaded pin 68.

According to various embodiments, portions of each of the range brackets 32 can include one or more leveling mechanisms, such that as each of the threaded pins 68 are adjusted to vertically operate the respective top flanges 34 of each of the range brackets 32, the user can use the various leveling mechanisms to determine when the top member 28 of the range 12 is substantially level. It is also contemplated that the user can operate the various threaded pins 68 to vertically operate the top flanges 34 and, in turn, portions of the top member 28 of the range 12 in order to achieve a substantially flush relationship between the bottom surface 30 of the top member 28 of the range 12 and the top surface 22 of the countertop 16. In this manner, a substantially flush engagement between the top member 28 and the countertop 16 can be achieved while allowing the engagement between the top portion 72 of the threaded pin 68 and the top flange 34 to provide the primary support for the range 12. In this manner, minimal stresses are placed upon the top member 28 of the range 12 while also achieving a substantially flush installation between the top member 28 and the countertop 16.

In various conventional countertops, the top member 28, typically made of glass-type materials, provides a primary supporting surface for the entire range. In such conventional ranges, these primary supporting stresses placed upon the top member 28 of the range 12 can place rotational or torque-type forces upon the material of the top member 28 resulting in damage to the top member 28 that can include fractures in the material, cracking, or complete failure of the material of the top member 28.

Conversely, according to the various embodiments of the inside-mount countertop-range support 10 described herein, a range 12 installed within an opening 14 defined within a countertop 16 is primarily supported by the relationship between the counter brackets 18 and range brackets 32, rather than the engagement between the top member 28 and the countertop 16. In this manner, a flush installation between the top member 28 of the range 12 and the countertop 16 is achievable without placing undue rotational or torque-type stresses upon the top member 28 that may otherwise cause damage to the top member 28.

Referring again to the embodiment illustrated in FIG. 2, it is contemplated that when the range 12 is installed within the opening 14 defined within the countertop 16, the bottom surface 30 of the top member 28 of the range 12 will be flush with the top surface 22 of the countertop 16. Such a flush relationship may be sufficient to prevent liquid from seeping between the top member 28 and the countertop 16 and can repel debris from becoming lodged between these members. In various embodiments, it is contemplated that in order to further prevent liquid from seeping between the top member 28 and the countertop 16, sealant can be used around the outer edge 54 of the top member 28 at the countertop 16. According to various embodiments, the sealant is not needed to bond the top member 28 to the countertop 16 or to provide a cushioning support between the top member 28 of the countertop 16, as the countertop 16 does not provide the primary support for the top member 28, according to the various embodiments.

Figure 5:
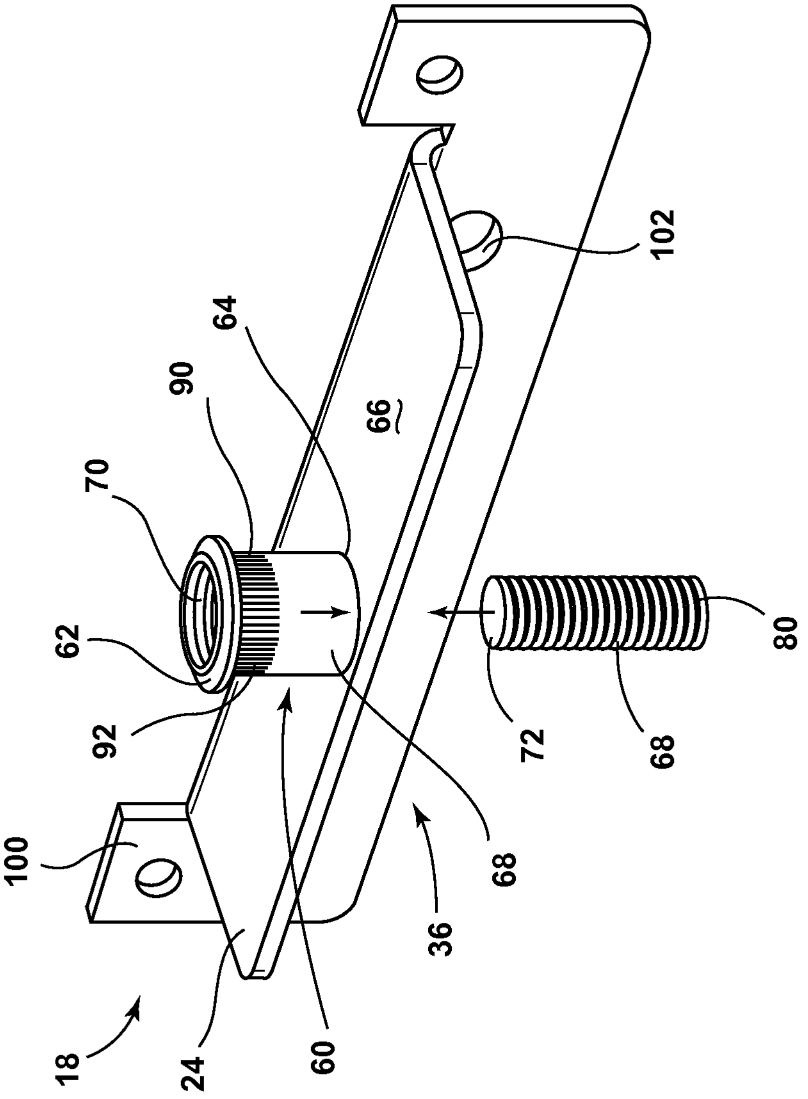
FIG. 5 is a detail perspective view of an alternate embodiment of the inside-mount countertop-range support.

Referring now to the embodiment of FIG. 5, the base flange 24 of the counter bracket 18 can include the support opening 64 that is configured to receive the adjusting sleeve 60 having the perimetrical flange 62. In order to retain the adjusting sleeve 60 within the support opening 64, a portion of the adjusting sleeve 60 can include a tapered outside surface 90, wherein the tapered outside surface 90 of the adjusting sleeve 60 disposed within the support opening 64 creates a secure and substantially non-rotating relationship between the tapered outer surface of the adjusting sleeve 60 and the support opening 64 such that the adjusting sleeve 60 is substantially free of rotation while in the support opening 64. It is also contemplated that the outer surface of the adjusting sleeve 60 can include one or more fluted portions 92 that are adapted to engage portions of the support opening 64 to substantially retain the adjusting sleeve 60 within the support opening 64. According to various embodiments, it is contemplated that the fluted portions 92 can be defined within the tapered outside surface 90 of the adjusting sleeve 60.

Referring again to the embodiment illustrated in FIGS. 2 and 5, it is contemplated that the base flange 24 of each counter bracket 18 can include an attachment flange 100 that is disposed substantially perpendicular to the base flange 24. According to the various embodiments, the attachment flange 100 is configured to engage the inner edge 20 of the opening 14 defined within the countertop 16. Defined within the attachment flange 100 can be a plurality of fastening openings 102 through which fasteners 104 can be disposed in order to fixedly attach, through various fasteners 104 that can include screws, nails, bolts, and other similar type fasteners to permanently fix the counter bracket 18 to the inner edge 20 of the opening 14. Such fasteners 104 are typically used where the countertop 16 is made of wood, or other similar material that is adapted to receive such fasteners 104. Where the countertop 16 is made of a solid surface, such as granite, quartz, or other similar solid surface, the attachment flange 100 of the counter bracket 18 can be adhered to the inner edge 20 of the opening 14 via various adhesives that can include, but are not limited to, glue, epoxy, or other similar adhesive.

According to various embodiments, it is contemplated that the base flange 24 can be disposed within a portion of the inner edge 20 of the opening 14 defined from the countertop 16. In such an embodiment, the base flange 24 can include a substantially planar member that is at least partially disposed and fixed within a receiving slot defined within the inner edge 20 of the opening 14 of the countertop 16. Accordingly, a portion of the base flange 24 also extends out from the receiving slot defined within the inner edge 20 that is configured to receive the top flange 34 of the range bracket 32. In this embodiment, where the counter bracket 18 is a single planar member making up the base flange 24 that is seated within the retaining slot of the countertop 16, the portion of the base flange 24 disposed within the retaining slot of the countertop 16 is either mechanically or adhesively fixed within the retaining slot, such that the base flange 24 is in a substantially fixed position relative to the countertop 16 in order to receive and support the top flange 34 of the range bracket 32.

According to various alternate embodiments, where a solid surface makes up the countertop 16, a lug opening can be defined through the inner edge 20 of the opening 14 and the attachment bracket can include a lug that can be at least partially inserted into the lug opening defined through the inner edge 20 of the opening 14. In such an embodiment, a structural adhesive or epoxy can be used to retain the lug within the lug opening defined within the inner edge 20 of the opening 14. Once the attachment flange 100 is affixed to the inner edge 20 of the opening 14, the base flange 24 is configured to extend substantially perpendicular to the attachment flange 100 into the opening 14 defined within the countertop 16.

According to the various embodiments, it is contemplated that the attachment flange 100 can extend substantially along the length of one of the sides 110 (shown in FIG. 1) of the inner edge 20 of the opening 14 to provide a maximum attaching surface between the counter bracket 18 and the inner edge 20 of the opening 14 defined within the countertop 16. In such an embodiment, a plurality of base flanges 24 are configured to extend from the elongated attachment bracket, wherein each of the base flanges 24 extends perpendicularly into the opening 14 defined within the countertop 16. Accordingly, each of the base flanges 24 that extends from the elongated attachment flange 100 includes a dedicated supporting or adjusting sleeve 60 that receives the threaded pin 68 to vertically adjust the top flange 34 of the range bracket 32.

According to various embodiments, it is contemplated that the various range brackets 32 connected to the range 12 can include a top flange 34 that is elongated and extends substantially along a portion of the length of each side of the range 12. In such an embodiment, a single top flange 34 that extends along a side of the range 12 can engage a plurality of threaded pins 68 that extend from two or more base flanges 24. It is further contemplated that the top flange 34 can include a single elongated top flange 34 member that extends along the length of the range 12.

Referring again to the embodiment of FIGS. 1-4, the tooling portion 80 defined within the bottom of the threaded pin 68 is disposed below the top surface 22 of the countertop 16 such that the tooling portion 80 can only be accessed from a cabinet area 120 underneath the countertop 16. In this manner, when the user rotationally adjusts the threaded pin 68 to vertically operate the threaded pin 68 to adjust the height of the range 12, such adjustment is done from below the countertop 16 in order to conceal the threaded pin 68, as well as the base flange 24 and remainder of the counter bracket 18 within the cabinet area 120. In turn, the range bracket 32 is also concealed such that the only visible portion of the range 12 and the inside-mount countertop-range support 10 is the top member 28 of the range 12 and any controls that may be mounted within the countertop 16.

Referring now to FIGS. 1-6, having disclosed and described the various embodiments of the inside-mount countertop-range support 10 for flush-mount countertop range 12, a method 500 for installing a flush-mount countertop range 12 onto a countertop 16 using an inside-mount countertop-range support 10 is described. According to the method 500, an opening 14 for the range 12 is cut, scribed, or otherwise defined within the surface of the countertop 16 (step 502), such that the opening 14 defines an inner edge 20 to which the various counter brackets 18 can be attached. Accordingly, once the opening 14 is properly defined, the method 500 includes step 504 of disposing a plurality of counter brackets 18 onto an inner edge 20 of the opening 14 defined within the countertop 16. Once so installed, each counter bracket 18 is installed upon the inner edge 20 of the opening 14 such that a base flange 24 of each of the counter brackets 18 extends from the inner edge 20 of the opening 14 and into the opening 14. As discussed above, each of the counter brackets 18 can include an attachment flange 100 that can be attached to the inner edge 20 of the opening 14, wherein the base flange 24 and the attachment flange 100 are substantially perpendicular with respect to one another. Once the counter brackets 18 are disposed within the inner edge 20 of the opening 14, adjustment members 36 are provided and disposed within each base flange 24 of the plurality of counter brackets 18 (step 506). In the various embodiments, each adjustment member 36 can include a threaded pin 68 that rotates within the base flange 24 and vertically operates the threaded pin 68 relative to the base flange 24 as the threaded pin 68 is rotated within the base flange 24.

It is contemplated that the threaded pin 68 can rotationally operate within the support opening 64 defined within the base flange 24. In such embodiments, the threaded sleeve is not used, and the threaded pin 68 simply rotates within the support opening 64 defined within the base flange 24. According to various alternate embodiments, the adjustment member 36 can include the supporting or adjusting sleeve 60 that defines a threaded interior 70. In such an embodiment, as discussed above, the threaded interior 70 is configured to receive and rotationally cooperate with the threaded pin 68 to operate the threaded pin 68 vertically with respect to the base flange 24. Further, according to various embodiments, the supporting or adjustment sleeve can include an outer surface that includes a contoured portion, where the contoured portion of the outer surface of the adjusting sleeve 60 secures the adjusting sleeve 60 within the support opening 64 such that the adjusting sleeve 60 is free of rotational movement within the support opening 64. As such, as the user engages the tooling portion 80 of the threaded pin 68, the contoured portion of the adjusting sleeve 60 substantially retains the adjusting sleeve 60 within the support opening 64, such that as the user rotates the threaded pin 68, the adjusting sleeve 60 does not also rotate in such a way that would frustrate the user's efforts in attempting to rotate the threaded pin 68.

Figure 6:
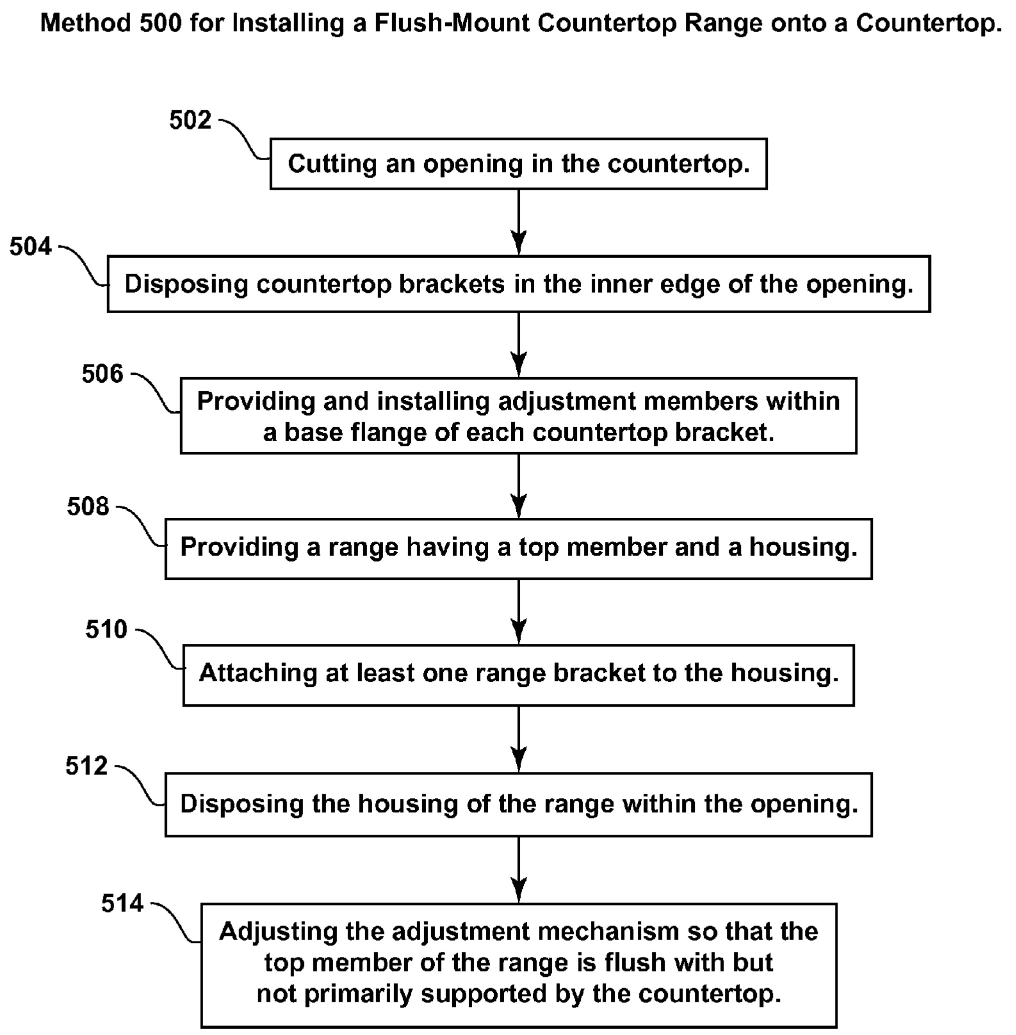
FIG. 6 is a schematic flow diagram illustrating one embodiment of a method for installing a flush-mount countertop range into a countertop using an inside-mount countertop-range support.

Referring again to the embodiment of the method 500 illustrated in FIG. 6, once the adjustment member 36 is disposed within each base flange 24, a range 12 is provided where the range 12 includes a housing 26 and a top member 28 that is disposed above the housing 26 (step 508). The top member 28 is sized such that it is larger than the opening 14 defined within the countertop 16, and the top member 28 extends over the entire opening 14 such that a bottom surface 30 of the top member 28 is configured to engage a portion of the top surface 22 of the countertop 16 around the entire perimeter of the opening 14 defined within the countertop 16. Prior to installation of the range 12 into the opening 14 defined within the countertop 16, at least one range bracket 32 is attached to the housing 26 (step 510). Each range bracket 32 includes a top flange 34 that extends outward from the housing 26 and toward an outer edge 54 of the top member 28.

Once the range brackets 32 are attached to the housing 26, the range 12 is disposed within the opening 14 such that the range brackets 32 are disposed into the opening 14 along with the housing 26 (step 512). In this manner, the top flanges 34 of each of the range brackets 32 are adapted to rest upon a top portion 72 of each of the threaded pins 68 disposed within the base flanges 24 of each of the plurality of counter brackets 18. The top flanges 34 of each of the range brackets 32 are disposed upon the threaded pins 68 such that the rotation of each of the threaded pins 68 vertically operates the top flange 34 and the range 12 relative to the base flange 24 and the countertop 16.

Once the range 12 is disposed within the opening 14, each of the threaded pins 68 is adjusted to vertically operate the range 12 such that the bottom surface 30 of the top member 28 of the range 12 engages and is flush with the top surface 22 of the countertop 16 (step 514). In adjusting each of the threaded pins 68, the height of the range 12 is adjusted such that the top member 28 is minimally supported by the engagement between the top flange 34 and the base flange 24 to minimize stresses exerted upon the top member 28 of the range 12.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An inside-mount countertop-range support comprising:
- a counter bracket configured to be engaged to an inner edge of an opening defined within a countertop, wherein the counter bracket includes a base flange that is configured to extend into the opening;
- a range having a housing and ceramic top member above the housing, wherein a beveled edge of the ceramic top member extends beyond the counter bracket and is configured to extend beyond the opening when the housing is disposed within the opening;
- a range bracket coupled to the housing and including a top flange that is received by and is supported by the base flange, wherein when the top flange rests upon the base flange to define a primary support of the range and the ceramic top member, a bottom surface of the ceramic top member at the beveled edge directly engages and is flush with a top surface of the countertop; and
- an adjustment member disposed within the base flange, the adjustment member configured to adjust a height of the top flange relative to the base flange, such that the beveled edge of the ceramic top member is flush with and is minimally supported by the top surface of the countertop and wherein the adjustment member includes an adjusting sleeve having a perimetrical flange, wherein the adjusting sleeve extends through a support opening defined within the base flange and the perimetrical flange rests upon an upper surface of the base flange around the support opening.

2. The inside-mount countertop-range support of claim 1, wherein the adjustment member includes a threaded pin that cooperates with a threaded interior of the adjusting sleeve, and wherein the threaded pin rotates within the threaded interior of the adjusting sleeve to vertically operate the threaded pin relative to the adjusting sleeve and the base flange, wherein the top flange is vertically supported from below by a top portion of the threaded pin.

3. The inside-mount countertop-range support of claim 2, wherein the threaded pin includes an adjustment slot defined within a bottom portion of the threaded pin, wherein the adjustment slot is accessible through the threaded interior of the adjusting sleeve to rotate the threaded pin within the threaded interior of the adjusting sleeve to vertically operate the threaded pin relative to the base flange.

4. The inside-mount countertop-range support of claim 1, further comprising a plurality of counter brackets that are coupled to the inner edge of the opening defined within the countertop.

5. The inside-mount countertop-range support of claim 4, wherein the range bracket includes an elongated member that is configured to be supported by more than one of the plurality of counter brackets.

6. The inside-mount countertop-range support of claim 1, wherein the ceramic top member is a glass cooktop.

7. An opening-mounted range support assembly—comprising:

a range having a range housing and a ceramic cooktop member, the ceramic cooktop member having a beveled edge and a bottom face, wherein the bottom face at the beveled edge extends beyond an outer perimeter of the range housing;

a base flange configured to extend from an inner edge of an opening defined within a countertop, wherein the bottom face of the ceramic cooktop member extends beyond the base flange and is configured to extend beyond the inner edge of the opening;

a top flange extending outward from the outer perimeter of the range housing, wherein the top flange is supported by the base flange such that the bottom face of the ceramic cooktop member at the beveled edge is configured to rest upon an upper face of the countertop and the beveled edge of the ceramic cooktop member is minimally supported by the upper face of the countertop;

an adjusting sleeve disposed within the base flange and defining a threaded interior; and a threaded pin cooperatively and rotationally engaged with the threaded interior, wherein rotation of the threaded pin within the threaded interior simultaneously operates the threaded pin vertically with respect to the adjusting sleeve and the base flange, wherein the top flange rests upon an upper portion of the threaded pin, and wherein the rotation of the threaded pin within the adjusting sleeve vertically adjusts a position of the range housing relative to the base flange and the countertop.

8. The opening-mounted range support of claim 7, wherein the base flange includes a support opening configured to receive the adjusting sleeve, and wherein the adjusting sleeve includes a perimetrical flange that rests upon the base flange proximate the support opening.

9. The opening-mounted range support of claim 8, wherein the adjusting sleeve includes a tapered outer surface, wherein the tapered outer surface secures the adjusting sleeve within the support opening such that the adjusting sleeve is free of rotation within the support opening.

10. The opening-mounted range support of claim 9, wherein the tapered outer surface defines a plurality of fluted portions that are configured to rotationally secure the adjusting sleeve within the support opening of the base flange.

11. The opening-mounted range support of claim 8, wherein the base flange is connected to an attachment flange that extends substantially perpendicular from the base flange, wherein the attachment flange is connected to the inner edge of the opening defined within the countertop.

12. The opening-mounted range support of claim 7, further comprising:

a plurality of base flanges that are configured to extend from the inner edge of the opening defined within the countertop.

13. The opening-mounted range support of claim 12, wherein the top flange is an elongated member that is supported by more than one of the plurality of base flanges.

* * * * *